US012625278B2

(12) United States Patent
Scholz et al.

(10) Patent No.: US 12,625,278 B2
(45) Date of Patent: May 12, 2026

(54) SYSTEMS AND METHODS FOR IMPROVING GNSS-BASED NAVIGATION

(71) Applicants: The MITRE Corporation, McLean, VA (US); NASA Langley Research Center, Hampton, VA (US)

(72) Inventors: Arthur K. Scholz, Lunenburg, MA (US); Emily V. Bates, McLean, VA (US); Kenneth William Schmitt, Woburn, MA (US); Evan Tyler Dill, Poquoson, VA (US); Julian Gutierrez, Yorktown, VA (US)

(73) Assignees: The MITRE Corporation, McLean, VA (US); NASA Langley Research Center, Hampton, VA (US)

( * ) Notice: Subject to any disclaimer, the term of this patent is extended or adjusted under 35 U.S.C. 154(b) by 206 days.

(21) Appl. No.: 18/468,483

(22) Filed: Sep. 15, 2023

(65) Prior Publication Data

US 2024/0103184 A1 Mar. 28, 2024

Related U.S. Application Data

(60) Provisional application No. 63/407,273, filed on Sep. 16, 2022.

(51) Int. Cl.
| | |
|---|---|
| *G01S 19/39* | (2010.01) |
| *G01S 19/05* | (2010.01) |
| *G08G 5/32* | (2025.01) |
| *G08G 5/55* | (2025.01) |
| *G08G 5/57* | (2025.01) |

(52) U.S. Cl.
CPC ............ *G01S 19/396* (2019.08); *G01S 19/05* (2013.01); *G08G 5/32* (2025.01); *G08G 5/55* (2025.01); *G08G 5/57* (2025.01)

(58) Field of Classification Search
CPC ........ G01S 19/396; G01S 19/05; G01S 19/15; G08G 5/32; G08G 5/55; G08G 5/57
See application file for complete search history.

(56) References Cited

U.S. PATENT DOCUMENTS

2022/0221586 A1* 7/2022 Hansen .................. H04L 67/12

* cited by examiner

*Primary Examiner* — Alan D Hutchinson
(74) *Attorney, Agent, or Firm* — Morrison & Foerster LLP

(57) ABSTRACT

A method for global navigation satellite system (GNSS)-based navigation may include retrieving terrain data for a geographical region and satellite orbit data for a GNSS comprising a plurality of satellites. Then, for of a plurality of time steps in a time period and for each of a plurality of lateral positions in the geographic region, a minimum height at which each satellite is visible from the lateral position at the time step may be determined. Unique combinations of satellites visible from the lateral position at the time step may be identified and error objects indicating GNSS performance quality corresponding to the unique combination of satellites may be generated. Performance quality information may be produced based on the one or more unique combinations of satellites and the respective one or more error objects. At least one aircraft may be operated based on this performance quality information.

39 Claims, 9 Drawing Sheets

300

600

For each time step:

For each satellite:

602 Initialize minimum satellite visibility height as POI altitude

604 Iterate from POI away from the satellite along shadow line

For each iteration point:

606 Determine whether IP height is below height of shadow line

608 Update minimum satellite visibility height

700

For each time step:

For each lateral location:

702

Sort satellites by minimum satellite visibility height

For each height point:

704

Determine combination of visible satellites

706

Sort combinations of visible satellites to identify unique combinations

For each unique combination:

708

Compute outputs (DOP, error covariance matrix, error ellipse, etc.)

SYSTEMS AND METHODS FOR IMPROVING GNSS-BASED NAVIGATION

CROSS-REFERENCE TO RELATED APPLICATIONS

This application claims the benefit of U.S. Provisional Application No. 63/407,273, filed Sep. 16, 2022, the entire contents of which is incorporated herein by reference.

STATEMENT REGARDING FEDERALLY SPONSORED RESEARCH OR DEVELOPMENT

This invention was made with Government support under contract number 80NSSC21P2774 awarded by NASA. The Government has certain rights in the invention.

FIELD

The present disclosure relates generally to computational techniques for improving GNSS-based navigation, particularly in obstacle-dense environments such as cities.

BACKGROUND

Advanced Air Mobility (AAM) is an emerging air transport system that aims to use aircraft to transport people and property in various environments. AAM applications currently in development include the use of unmanned aerial vehicles (UAVs) for package delivery as well as the use of (potentially autonomous) vertical-takeoff-and-landing (VTOL) vehicles as on-demand, airborne taxis.

Urban Air Mobility (UAM), a subset of AAM, focuses specifically on the utilization of highly automated aircraft at low altitudes in urban areas and has been the subject of increasing volumes of investment and research. A major predicted advantage of UAM solutions is a considerable reduction in travel time, both for those traveling by car—since increased use of aircraft for intra-city transportation will reduce roadway congestion—as well as for individuals and cargo traveling by aircraft, since aircraft can take more direct routes between locations than motor vehicles. Additionally, the electric infrastructure in urban environments may allow for the use of electric and hybrid-electric aircraft; UAM may, as a result, urban pollution may be significantly mitigated.

AAM technologies rely on global navigation satellite systems (GNSS) for positioning, navigation, and timing information. However, communication between an aircraft and a satellite system such as the Global Positioning System (GPS) frequently becomes problematic when the aircraft is in a complex environment such as a city. Obstacles such as buildings and trees may attenuate satellite signals and prevent the aircraft from receiving critical navigation data, increasing the risk of crashes, particularly if the aircraft is unmanned or highly automated.

SUMMARY

Provided are systems and methods for predicting GNSS performance in order to improve GNSS-based navigation. A combination of satellite orbit data and elevation data may be used to predict satellite visibility at varying locations within a given geographic region over a given period of time. These predictions may be used to supplement flight planning processes by assisting in the identification of safe, GNSS-visible routes between locations. Thus, the provided systems and methods may be employed in conjunction with AAM/UAM navigation systems to protect (particularly unmanned) aircraft from hazards and increase the likelihood that satellites in a GNSS remain visible to aircraft throughout flight.

A method for global navigation satellite system (GNSS)-based navigation may include retrieving, from one or more databases, terrain data for a geographical region and satellite orbit data for a GNSS comprising a plurality of satellites. The terrain data may comprise, for each of a plurality of lateral positions in the geographic region, elevation values associated with a height of the terrain at the lateral position. Then, for each time step of a plurality of time steps in a time period and for each lateral position of the plurality of lateral positions in the geographic region, the method may involve determining, for each satellite of the plurality of satellites in the GNSS, a minimum height at which the satellite is visible from the lateral position at the time step, determining one or more unique combinations of satellites visible from the lateral position at the time step based on the minimum heights at which each satellite is visible from the lateral position, and generating, for each of the one or more unique combinations of satellites, one or more error objects indicating GNSS performance quality corresponding to the unique combination of satellites. GNSS performance quality information may then be generated based on the one or more unique combinations of satellites and the respective one or more error objects. At least one aircraft may be operated based on the GNSS performance quality information.

Information indicating the geographical region and the time period may be received, e.g., from a user. The geographical region may correspond to a region in which the at least one aircraft will be operating. Similarly, the time period may correspond to a time frame in which the at least one aircraft will be operating. The terrain data comprises one or more digital surface maps and the orbit data may comprise GNSS almanac data. The GNSS may be the Global Positioning System (GPS). An aircraft of the at least one aircraft may be an unmanned aerial vehicle (UAV). Operating the at least one aircraft may comprise generating a flight plan for the one or more aircraft based on the GNSS performance quality information; the aircraft may be controlled based on this flight plan.

In some embodiments of the method, prior to determining, for each satellite of the plurality of satellites in the GNSS, the minimum height at which the satellite is visible from each lateral position of the plurality of lateral positions at each time step of the plurality of time steps, a trajectory of each satellite of the plurality of satellites is propagated during the time period. Determining, for a satellite of the plurality of satellites in the GNSS, the minimum height at which the satellite is visible from a lateral position of the plurality of lateral positions at a time step of the plurality of time steps can comprise determining, at one or more locations along an azimuthal vector between the lateral position and the satellite, a minimum altitude required for line-of-sight to the satellite from the lateral position without obstruction by terrain at each azimuthal vector location. Alternatively, determining, for a satellite of the plurality of satellites in the GNSS, the minimum height at which the satellite is visible from a lateral position of the plurality of lateral positions at a time step of the plurality of time steps can involve iterating along a shadow line that starts at a height point corresponding to the lateral position and is directed away from the satellite and, at one or more lateral locations corresponding to one or more points along the shadow line, determining a minimum altitude required for the satellite to be visible based on a height of the shadow line at said point. Determining the one or more unique combinations of visible satellites at a time step of the plurality of time steps at a lateral position of the plurality of lateral locations may include determining, based on the minimum heights at which each satellite is visible from the lateral position at the time step, for each of a plurality of height points located at the lateral position, a combination of satellites of the plurality of satellites that are visible at the height point.

The minimum heights at which each satellite is visible at each lateral position may be determined simultaneously for each time step using a GPU Similarly, the one or more unique combinations of visible satellites at each lateral position may also be determined simultaneously for each time step using a GPU.

The one or more error objects may include a dilution of precision value, a covariance matrix, or a combination thereof. Outputting GNSS performance quality information may comprise generating and displaying a graphical representation of GNSS performance quality in the geographical region at each time step. Outputting GNSS performance quality information can also involve generating and displaying a graphical representation of GNSS performance quality in the geographical region at each time step.

A system for global navigation satellite system (GNSS)-based navigation may include at least one aircraft and a computer system comprising one or more processors. At least one of the one or more processors may be a GPU. The one or processors may be configured to retrieve, from one or more databases, terrain data for a geographical region and satellite orbit data for a GNSS comprising a plurality of satellites. The terrain data may comprise, for each of a plurality of lateral positions in the geographic region, elevation values associated with a height of the terrain at the lateral position. The one or more processors may be further configured, for each time step of a plurality of time steps in a time period and for each lateral position of the plurality of lateral positions in the geographic region, to determine, for each satellite of the plurality of satellites in the GNSS, a minimum height at which the satellite is visible from the lateral position at the time step, to determine one or more unique combinations of satellites visible from the lateral position at the time step based on the minimum heights at which each satellite is visible from the lateral position, and to generate, for each of the one or more unique combinations of satellites, one or more error objects indicating GNSS performance quality corresponding to the unique combination of satellites. Subsequently, the one or more processors may be configured to determine GNSS performance quality information based on the one or more unique combinations of satellites and the respective one or more error objects and operate the at least one aircraft based on the GNSS performance quality information.

The one or more processors may be configured to receive information indicating the geographical region and the time period. The geographical region may correspond to a region in which the at least one aircraft will be operating. Similarly, the time period may correspond to a time frame in which the at least one aircraft will be operating. The terrain data comprises one or more digital surface maps and the orbit data may comprise GNSS almanac data. The GNSS may be the Global Positioning System (GPS). An aircraft of the at least one aircraft may be an unmanned aerial vehicle (UAV). Operating the at least one aircraft may comprise generating a flight plan for the one or more aircraft based on the GNSS performance quality information; the one or more processors may control the at least one aircraft based on this flight plan.

In some embodiments of the system, prior to determining, for each satellite of the plurality of satellites in the GNSS, the minimum height at which the satellite is visible from each lateral position of the plurality of lateral positions at each time step of the plurality of time steps, the one or more processors may be configured to determine a trajectory of each satellite of the plurality of satellites is propagated during the time period. Determining, for a satellite of the plurality of satellites in the GNSS, the minimum height at which the satellite is visible from a lateral position of the plurality of lateral positions at a time step of the plurality of time steps can comprise determining, at one or more locations along an azimuthal vector between the lateral position and the satellite, a minimum altitude required for line-of-sight to the satellite from the lateral position without obstruction by terrain at each azimuthal vector location. Alternatively, determining, for a satellite of the plurality of satellites in the GNSS, the minimum height at which the satellite is visible from a lateral position of the plurality of lateral positions at a time step of the plurality of time steps can involve iterating along a shadow line that starts at a height point corresponding to the lateral position and is directed away from the satellite and, at one or more lateral locations corresponding to one or more points along the shadow line, determining a minimum altitude required for the satellite to be visible based on a height of the shadow line at said point. Determining the one or more unique combinations of visible satellites at a time step of the plurality of time steps at a lateral position of the plurality of lateral locations may include determining, based on the minimum heights at which each satellite is visible from the lateral position at the time step, for each of a plurality of height points located at the lateral position, a combination of satellites of the plurality of satellites that are visible at the height point.

As noted, the one or more processors may include a GPU. The minimum heights at which each satellite is visible at each lateral position can be determined simultaneously for each time step using a GPU Similarly, the one or more unique combinations of visible satellites at each lateral position may also be determined simultaneously for each time step using a GPU.

The one or more error objects may include a dilution of precision value, a covariance matrix, or a combination thereof. Outputting GNSS performance quality information may comprise generating and displaying a graphical representation of GNSS performance quality in the geographical region at each time step. Outputting GNSS performance quality information can also involve generating and displaying a graphical representation of GNSS performance quality in the geographical region at each time step.

BRIEF DESCRIPTION OF THE FIGURES

The invention will now be described, by way of example only, with reference to the accompanying drawings.

DETAILED DESCRIPTION

The feasibility of emerging air transport systems such as Advanced Air Mobility (AAM) and Urban Air Mobility (UAM) hinges on the ability of aircraft to effectively navigate obstacles such as buildings and trees. Effective navigation, in turn, requires positioning, navigation, and timing (PNT) data to be provided to the aircraft during all phases of flight. PNT data is typically provided to aircraft by a global navigation satellite system (GNSS) such as GPS.

Figure 1:
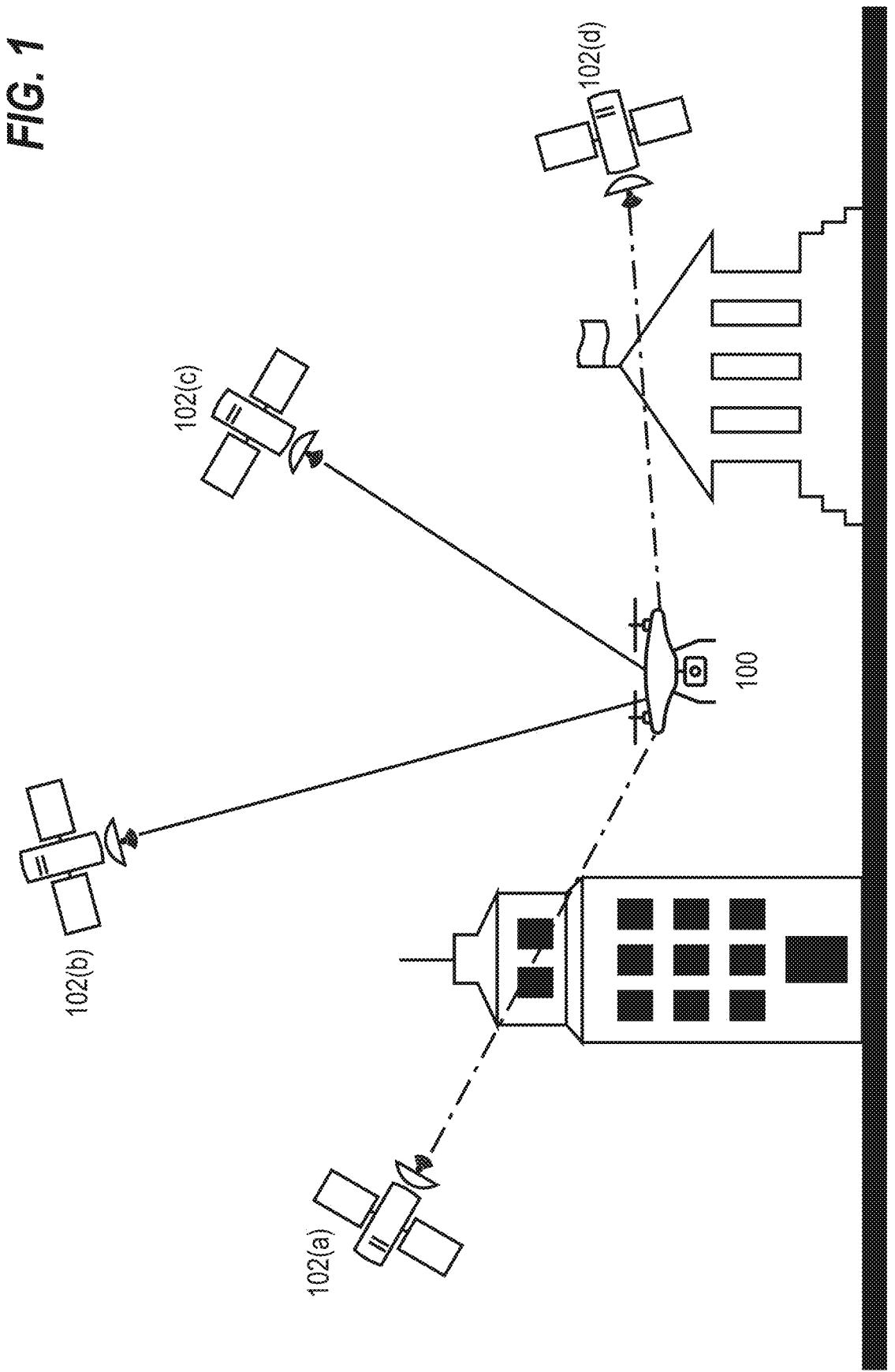
FIG. 1 illustrates an example aerial vehicle navigating an example urban environment.

The quality of communication between a GNSS and an aircraft at a given location at a given time may depend on the number of satellites that are visible to the aircraft at said location and time. The visibility of a satellite to an aircraft at a given location and time may depend on numerous factors, including the satellite's orbit, the altitude of the aircraft, and the number, geometry, and type of obstacles in the aircraft's vicinity. This problem is illustrated in FIG. 1. In this figure, an aircraft 100 is shown flying between a pair of buildings. Satellites 102(*a*), 102(*b*), 102(*c*), and 102(*d*) are above the horizon and, in the absence of any obstacles, would be visible to aircraft 100. However, due to the locations of the buildings relative to the satellites and aircraft 100, aircraft 100 only has a direct line-of-sight (LOS) to satellites 102 (*b*) and 102 (*c*) at its depicted position. While signals from satellite 102 (*a*) and satellite 102 (*d*) may be received by aircraft 100, said signals may be attenuated or otherwise negatively affected by the buildings. As a result, aircraft 100 may not be able to rely on satellites 102 (*a*) and 102 (*d*) for PNT data.

Described herein are systems and methods for improving GNSS-based navigation in a geographical region by generating predictions, based on simulated satellite trajectories and environmental obstacles, of satellite visibility throughout the region. Specifically, the provided systems and methods may predict combinations of satellites in a GNSS that are visible at each point of a set of points in a hyper-volume that represents a given geographical region over a given period of time. For each unique satellite combination, a set of output values associated with GNSS performance quality may be determined. The satellite combinations, along with the associated output values, may be compared and leveraged to identify viable flight paths, particularly for highly autonomous or unmanned aircraft in complex, obstacle-dense environments such as cities.

System and Framework

Figure 2:
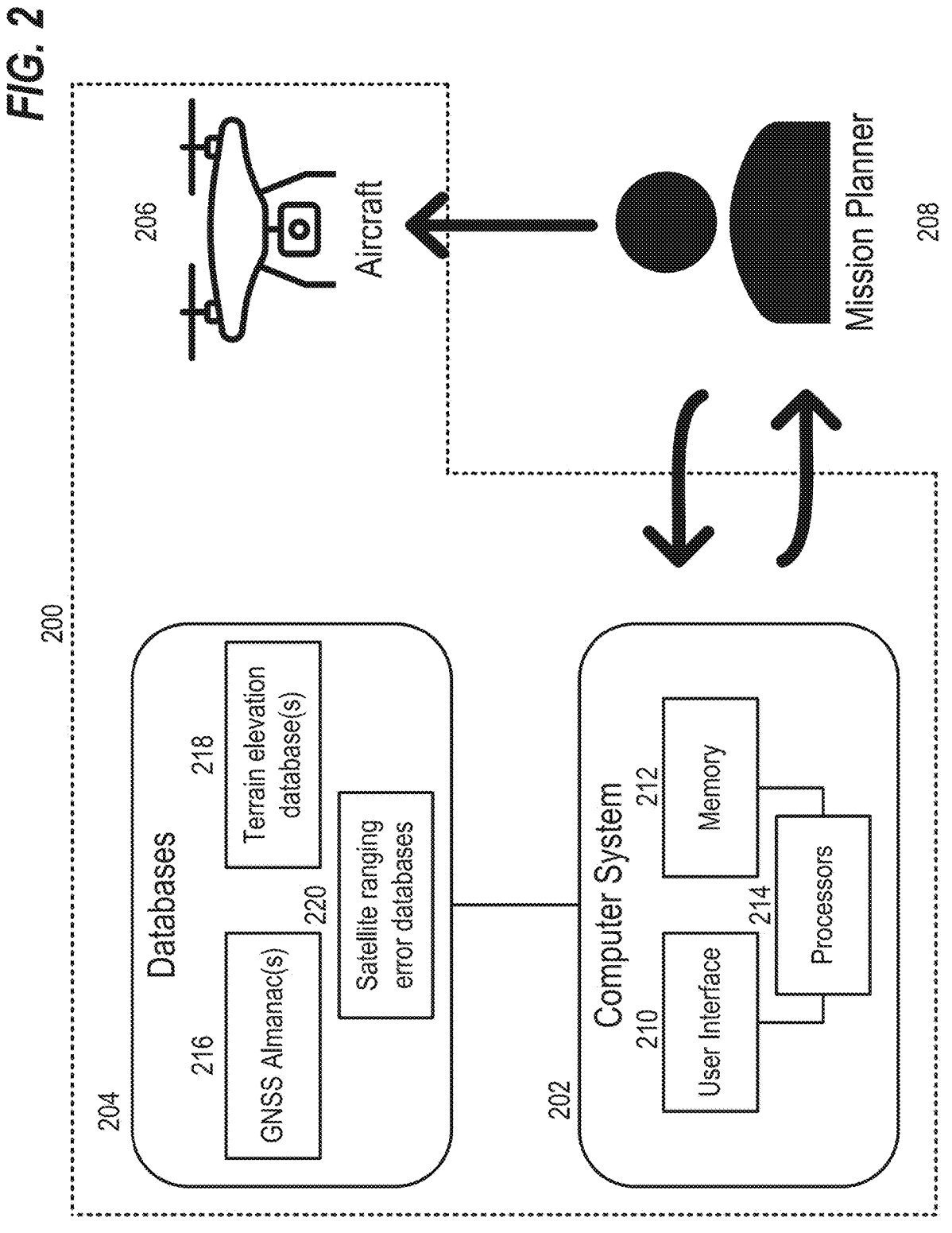
FIG. 2 shows a system for predicting and modeling GNSS performance, according to some embodiments.

An exemplary system 200 for modeling GNSS performance is depicted in FIG. 2. As shown, system 200 may include a computer system 202, a plurality of databases 204, and an aircraft 206. A mission planner 208 who operates aircraft 206 may interact with (e.g., receive information from or provide information to) system 200 via computer system 202.

Aircraft 206 may be any aerial vehicle. In particular, aircraft 206 may be a highly autonomous aerial vehicle configured to carry passengers or cargo or configured to collect information (e.g., configured to record audio or video). Examples of such vehicles include short take-off and landing (STOL) aircraft, vertical take-off and landing (VTOL) aircraft, small unmanned aircraft (SUA), unmanned aerial vehicles (UAVs, e.g., drones), and unmanned aircraft (UA). In various embodiments, aircraft 206 is piloted (at least partially) autonomously or piloted remotely (e.g., by mission planner 208).

Computer system 202 can be or can comprise any suitable type of microprocessor-based device such as a personal computer, workstation, server, or handheld computing device such as a phone or a tablet. Additionally or alternatively, computer system 202 can be or can comprise a dedicated computing device. Computer system 202 may include a user interface 210, memory 212, and one or more processors 214. User interface 210 may include any devices configured to facilitate the inputting of information to computer system 202 by a user as well as any devices configured to facilitate the outputting of information from computer system 202 to the user. For example, user interface 210 can include a display, a keyboard, a keypad, a mouse, a touch screen, a speaker, or combinations thereof. Memory 212 can be, e.g., electrical, magnetic, or optical memory such as RAM, a cache, a hard drive, a removable storage disk, or other non-transitory computer readable media. Processor(s) 214 may include any of, or any combination of, classical computing processors such as central processing unit(s) (CPU(s)), graphics processing unit(s) (GPU(s)), field programmable gate array(s) (FGPA(s)), and application-specific integrated circuit(s) (ASIC(s)).

Memory 212 may store software comprising instructions that, when executed by processor(s) 214, cause computer system 202 to model GNSS performance as described herein. The execution of such programs may be triggered upon receipt, by computer system 202, of user input from mission planner 208 requesting GNSS performance information. This request, along with any other information necessary to model GNSS performance (e.g., flight plan information for aircraft 206), may be input by mission planner 208 into computer system 202 via user interface 210. Upon receipt of the request, computer system 202 may access the plurality of databases 204 to retrieve data that is relevant to the GNSS performance modeling process. Such data may include, for example, satellite orbit data, elevation data for a geographical region, and satellite ranging error data. Accordingly, databases 204 may comprise GNSS almanacs (e.g., GPS almanacs), terrain elevation databases (e.g., digital surface map (DSM) databases such as those published by government organizations like the National Oceanic and Atmospheric Administration (NOAA)), and satellite ranging error databases (e.g., databases storing User Equivalent Ranging Error (UERE) information for each satellite in a GNSS).

To accelerate the modeling process, computer system 202 may be configured to execute some calculations simultaneously (i.e., in parallel), rather than sequentially. Processor(s) 214 may include the necessary hardware to enable such parallelization. In particular, as previously noted, processor(s) 214 may include a GPU. The GPU may have at least 100, at least 500, at least 1000, at least 5000, at least 10000, or at least 15000 cores, each of which may have at least 2, at least 3, at least 4, at least 5, at least 6, at least 7, at least 8, at least 9, or at least 10 threads. Example GPUs that may be used in computer system 202 include (but are not limited to) NVIDIA's GTX 1080, NVIDIA's RTX3080, NVIDIA's A6000, and NVIDIA's A100. Additionally or alternatively, processor(s) 214 may include CPU upon which certain calculations may be parallelized. The CPU may have multiple cores (e.g., at least 2, at least 3, at least 4, at least 5, at least 10, at least 15, or at least 20 cores), each of which may have multiple threads (e.g., at least 2, at least 4, at least 6, or at least 10 threads).

Figure 3:
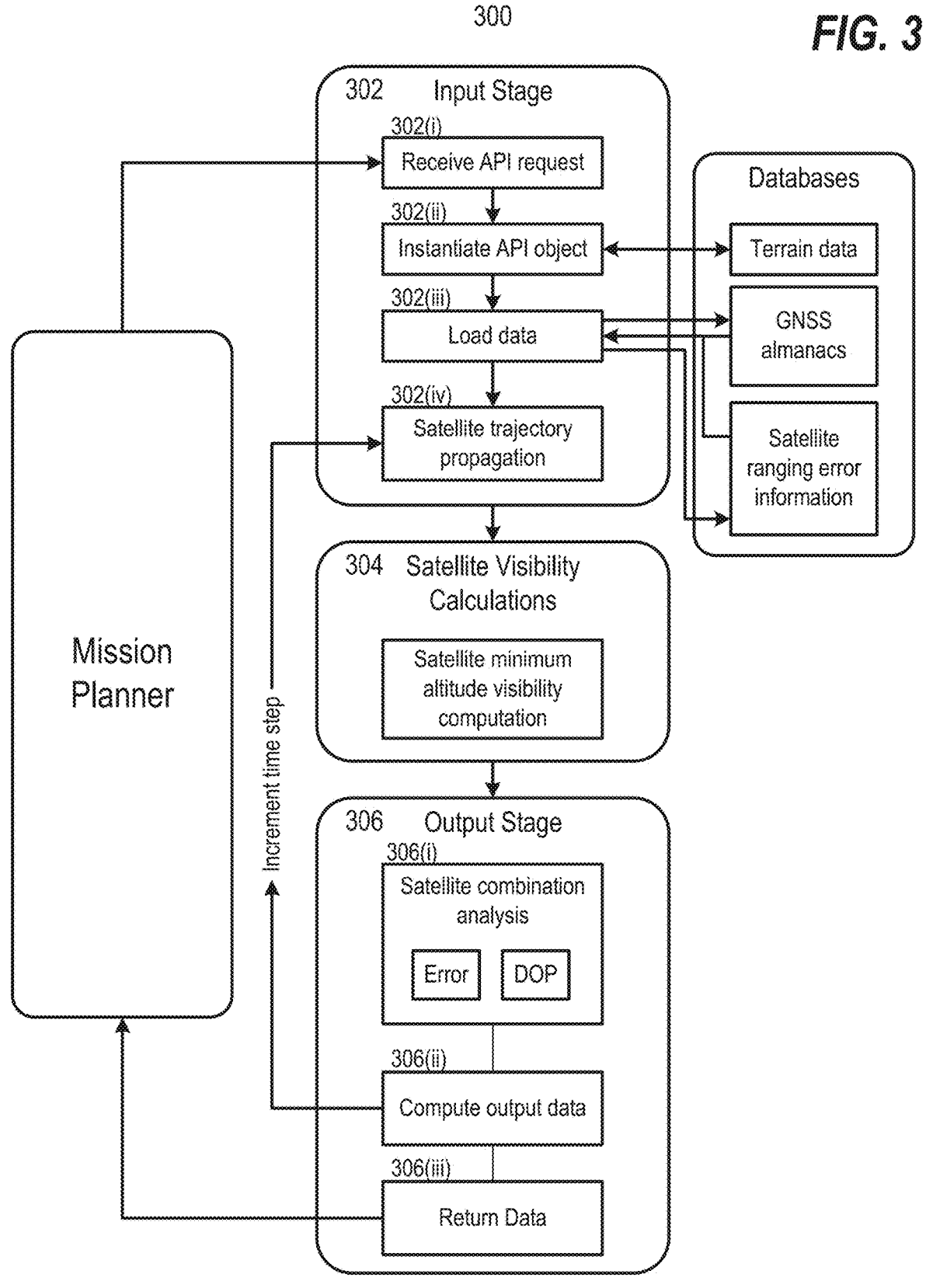
FIG. 3 shows a method for predicting and modeling GNSS performance, according to some embodiments.

An exemplary method 300 for modeling GNSS performance is depicted in FIG. 3. Method 300 may be executed by a computer system (e.g., computer system 202 shown in FIG. 2) of a system for modeling GNSS performance (e.g., system 200 shown in FIG. 2). Instructions for executing method 300 may be included in software that is stored in the memory of the computer system. The computer system may be configured to load said software and execute method 300 upon receipt of an appropriate trigger, for example the receipt of a request from a user (e.g., a mission planner) for GNSS performance information. Said request may include information indicating a geographical region through which an aircraft will travel during an upcoming flight as well as a time frame over which the upcoming flight will occur. For example, the user input may include departure and arrival locations (which may be specified, e.g., using longitudinal and latitudinal coordinates or as an address) as well as departure and arrival dates and times.

As shown in FIG. 3, method 300 may be divided into three major stages: an input stage 302, a satellite visibility calculation stage 304, and an output stage 306. The input stage 302 may be initiated at the start of method 300 and may facilitate the ingestion by the computer system of information required to model GNSS performance. The input stage 302 may also include steps for pre-processing data to discard information which has minimal impact on final satellite visibility predictions as well as to pre-compute and store information which may be regularly accessed at later stages. The satellite visibility calculation stage 304 may follow the input stage 302 and may result in the determination of altitudes at which each satellite in a GNSS is visible in a geographical region of interest. The output stage 306 may be responsible for converting the results of the satellite visibility calculations performed in stage 304 into a GNSS performance model using one or more error modeling techniques. Each of the stages of method 300 are discussed in detail in the subsequent sections.

Input Stage

As described, during the input stage 302 of method 300, information required by the computer system to model GNSS performance may be retrieved and processed. In some embodiments, the input stage commences with the receipt of an application programming interface (API) request (step 302(*i*)) from the mission planner. The API request may instantiate an API object (step 302(*ii*)) that retrieves terrain data for a geographical region of interest from a database (e.g., a database of the plurality of databases 204 shown in FIG. 2). Satellite orbit data, satellite ranging error information, or a combination thereof may then be loaded (step 302(*iii*)).

The terrain data may provide, for a given geographical region, a surveyed height, e.g., a surveyed height from aerial LiDAR scans. In some embodiments, the terrain data may have a resolution of 1×1 meter or finer. The height surveys may be represented by a GeoTIFF file that contains a raster grid representing a digital surface map (DSM) for the geographical region along with metadata indicating map projection and affine transformation coefficients. This may enable straightforward conversion of the terrain data to an earth-centered earth-fixed (ECEF) coordinate system. The height of the terrain at a given point in the geographical region can be provided based on the height of the lowest LiDAR value at said point or the highest LiDAR value at said point.

The terrain data, in combination with information (provided by the mission planner) indicating a time period of interest, can be used to produce a four-dimensional gridded map of the geographical region of interest. Each grid point in this map may comprise three spatial coordinates (e.g., x, y, and z coordinates, where x and y indicate lateral position and z indicates a height of the terrain relative to a reference height (e.g., mean sea level) at the lateral position) and one temporal coordinate indicating a time step in the time period of interest. The grid points may be uniformly spaced in each dimension.

Satellite orbit data may be received from a GNSS almanac and may comprise, for each satellite in the GNSS, the elevation angles and azimuthal angles of the satellite relative to a predetermined location (e.g., the location of the center of the geographical region of interest) at a plurality of time points in a time period. If the time period, for example, is a one-hour period between 12 p.m. and 1 p.m., then the satellite orbit data may provide the elevation angles and azimuthal angles of each satellite at a plurality of times within the one-hour period, e.g., at 12:00, 12:05, 12:10, 12:15, 12:20, 12:25, 12:30, and so on.

Satellite ranging error information may comprise the user equivalent range error (UERE) between each satellite in the GNSS and the GNSS receiver in an aircraft that will be communicating with the GNSS. The UERE may be represented as a data array, each entry of which may represent a satellite's ranging error (e.g., in meters). Whether or not satellite ranging error information is retrieved may depend upon the performance information that the mission planner wishes to receive at the conclusion of the GNSS performance modeling process (e.g., at the conclusion of method 300).

Figure 4:
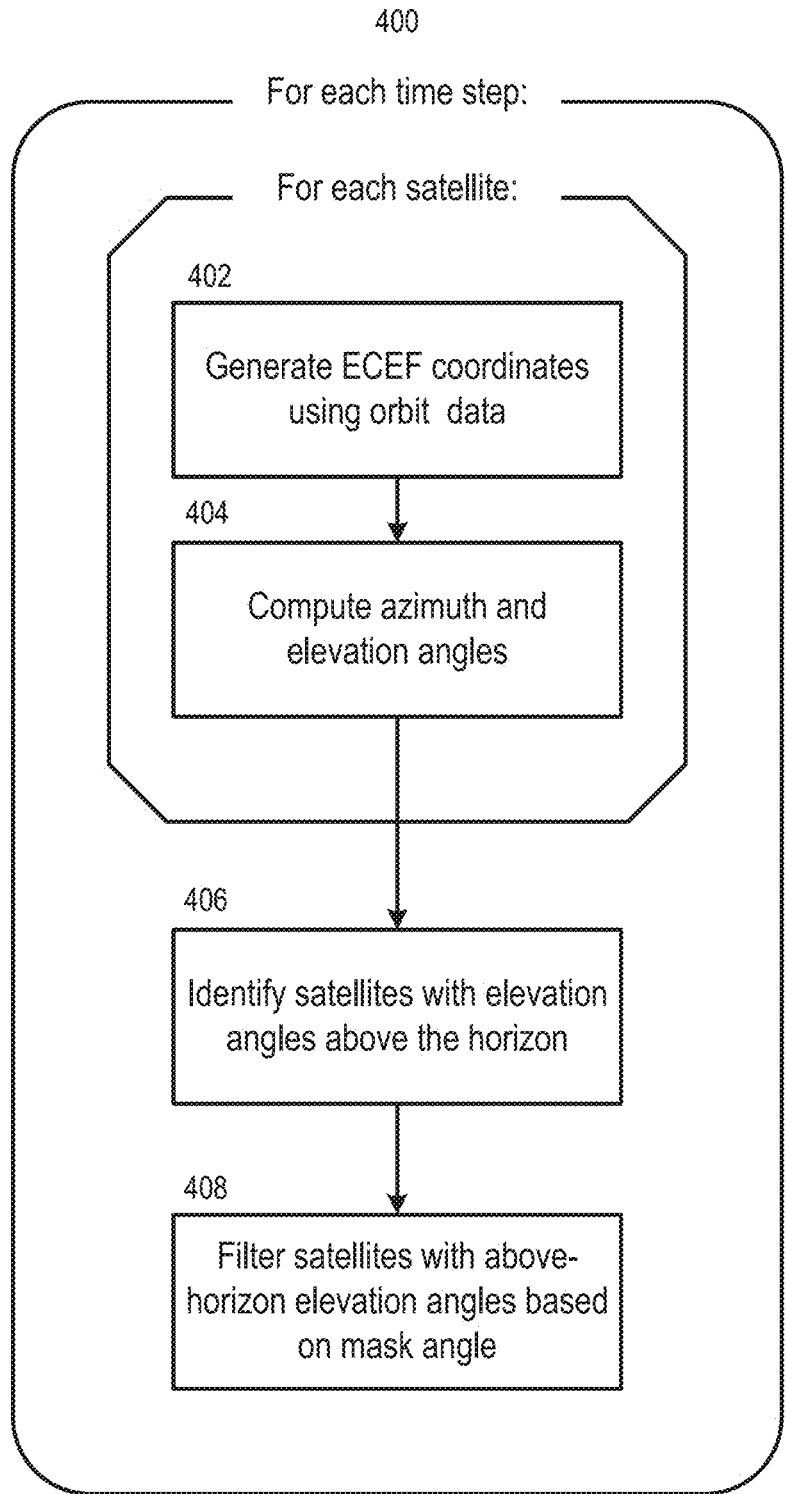
FIG. 4 shows a method for propagating satellite trajectories, according to some embodiments.

Following its loading, the data retrieved from the databases may be processed. Processing of the input data may comprise propagating the trajectories of each satellite in the GNSS (step 302(*iv*)). An exemplary method 400 that may be executed to propagate the trajectories is provided in FIG. 4. As shown, at each time step in the time period of interest, for each satellite in the GNSS, earth-centered earth-fixed (ECEF) coordinates may be generated based on the satellite orbit data (step 402). That is, for each satellite in the GNSS, at each time step in the time period of interest, the position of the satellite relative to the Earth's center of mass in cartesian coordinates may be determined. The ECEF coordinates of each satellite at each time step may be used to determine the azimuth and elevation angles (relative to a predetermined location such as, e.g., the location of the center of the geographical region of interest) of each satellite at each time step (step 404).

Once the azimuth and elevation angles for each satellite have been computed for each satellite at a given time step, all satellites with elevation angles above the horizon (e.g., elevation angles greater than 0°) may be identified (step 406). The satellites with elevation angles above the horizon may then be filtered based on a user-provided "mask angle" (step 408). The mask angle may be an elevation angle below which satellite signals may be rejected by a receiver on an aircraft that will be communicating with the GNSS. Filtering the satellites with elevation angles above the horizon based on the mask angle may comprise identifying satellites with elevation angles above the horizon and with elevation angles greater than or equal to the mask angle. Subsequent calculations (e.g., calculations performed during the satellite visibility calculation stage 304) associated with a given time step need not be performed for those satellites with elevation angles below the mask angle at said time step, since such a satellite, even if it is above the horizon and therefore "visible" at that time step, may not be capable of providing PNT data to an aircraft.

Satellite Visibility Calculation Stage

Figure 5A:
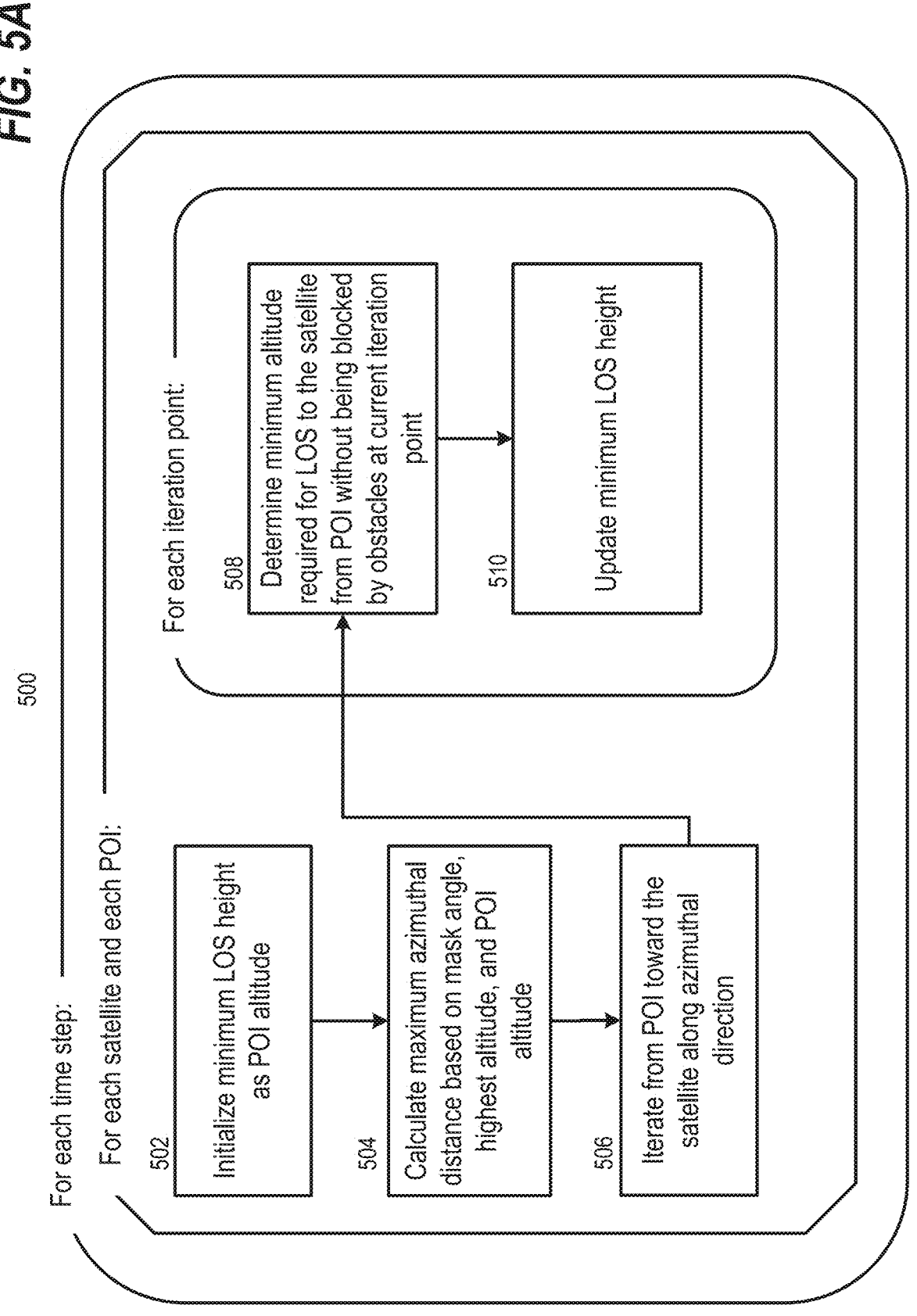
FIG. 5A shows a first method for determining satellite visibility heights, according to some embodiments.
Figure 5B:
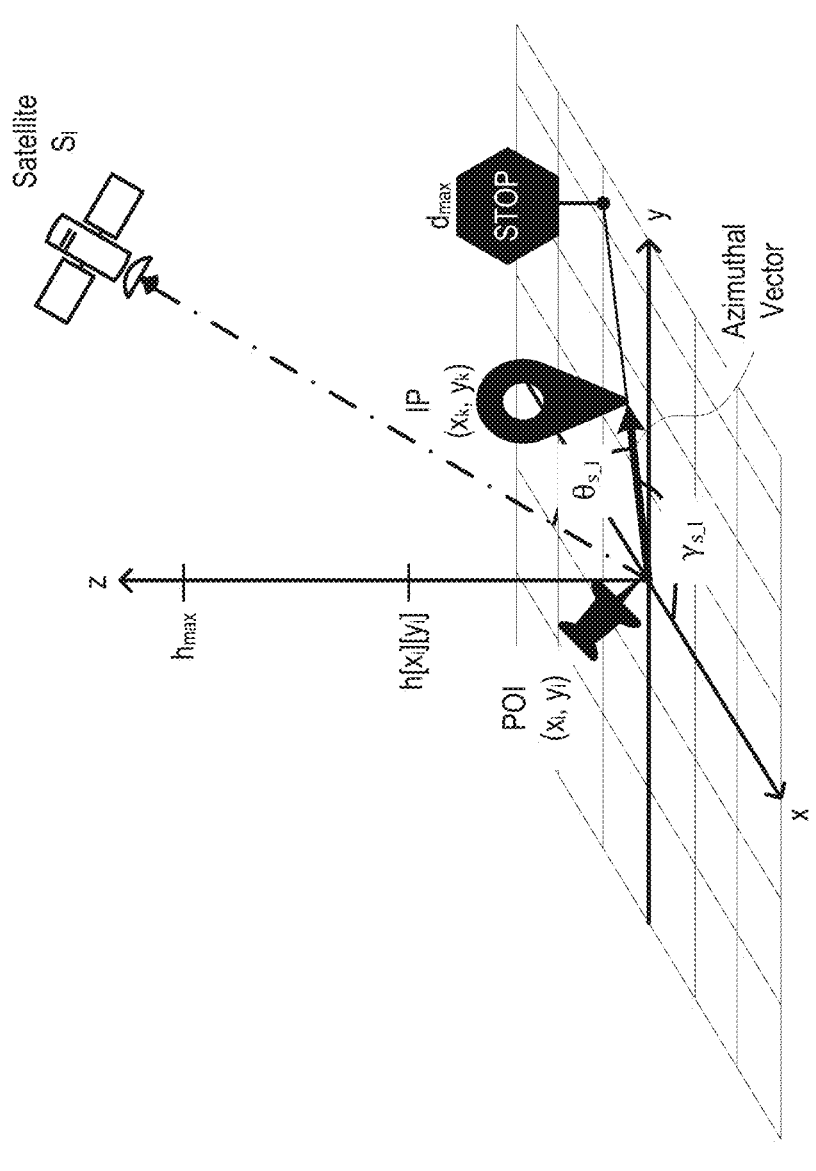
FIG. 5B shows a visual representation of the first method for determining satellite visibility heights, according to some embodiments.
Figure 6A:
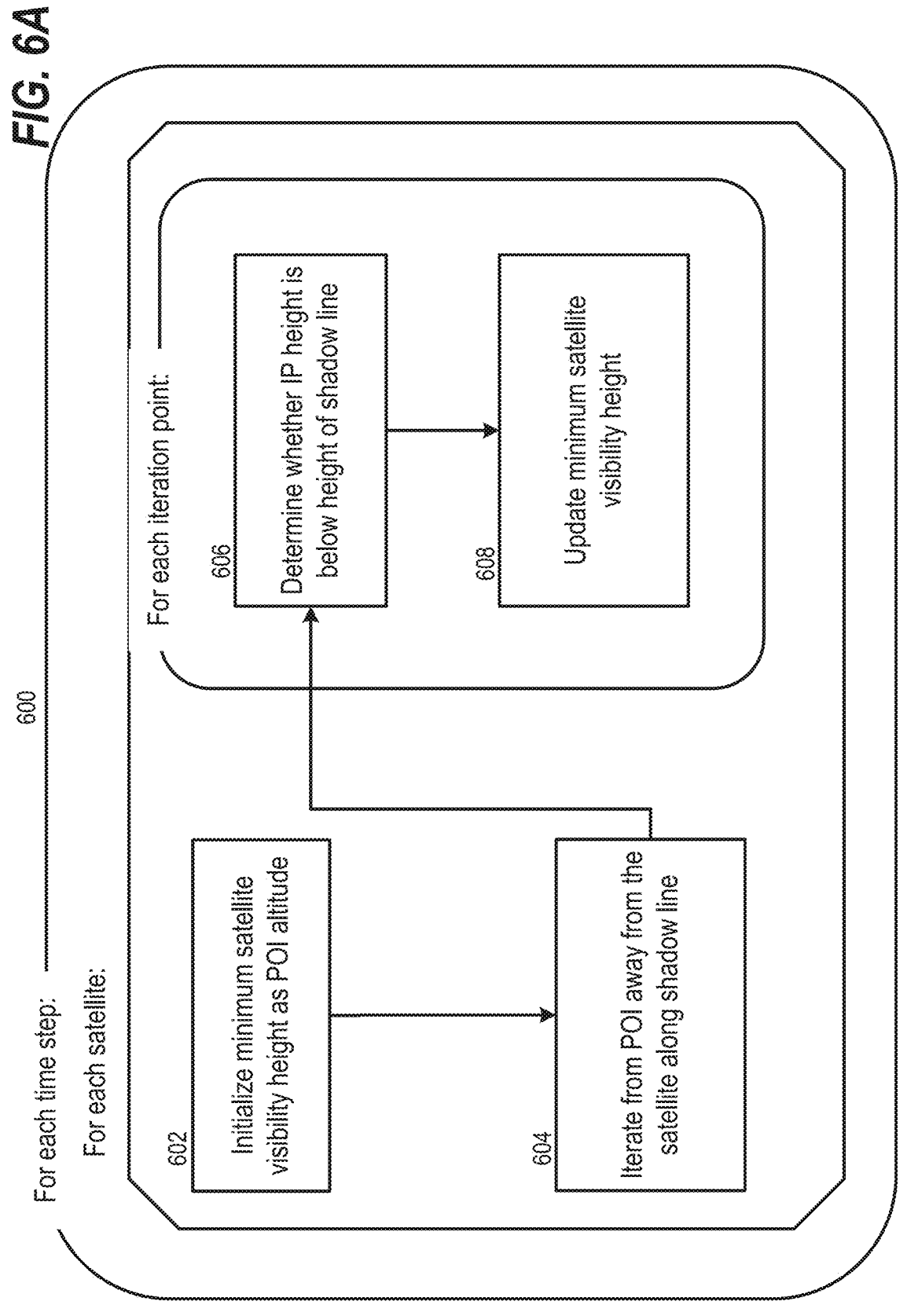
FIG. 6A shows a second method for determining satellite visibility heights, according to some embodiments.
Figure 6B:
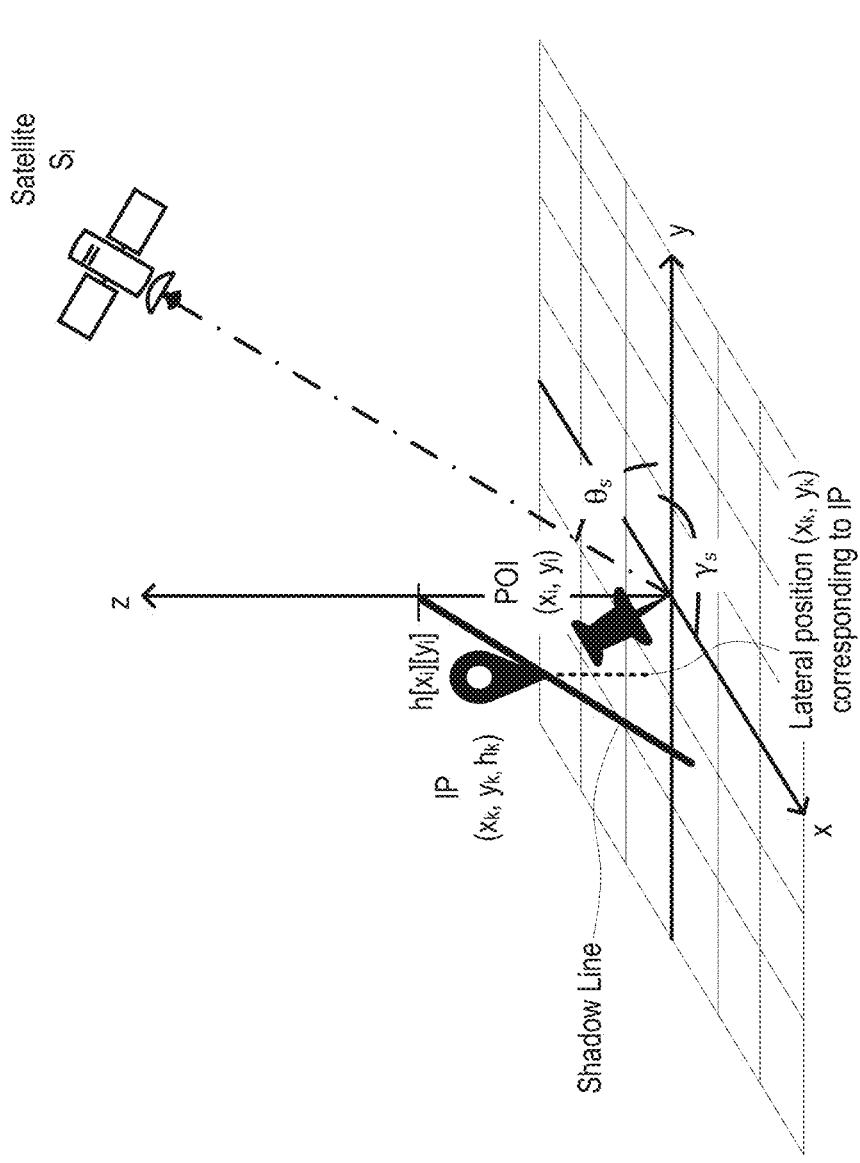
FIG. 6B shows a visual representation of the second method for determining satellite visibility heights, according to some embodiments.

During the satellite visibility calculation stage 304 of method 300, the (processed) data received in the input stage 302 may be used to determine the minimum altitude, at each lateral position in the geographical region, at which each satellite in a GNSS is visible at each time step. The algorithms employed to perform these calculations may vary based on, e.g., the positional resolution required by the aircraft that will traverse the geographic region and the length of the time period of interest. A first example algorithm is depicted in FIGS. 5A-5B; a second is depicted in FIGS. 6A-6B.

The first example algorithm 500 (FIG. 5A) may determine, for each satellite in the GNSS, at each time step, the minimum height required for line-of-sight to the satellite from a given lateral (i.e., (x, y)) position in the geographical region. For each time step in the time period, method 500 may be performed for every satellite with an elevation angle that exceeds the mask angle at every lateral point of interest (POI) defined in the geographical region. That is, for each:

> time step $t_j$ in the set $\{t_j\}_{j=1, 2, \ldots, T}$ of time steps into which the time period of interest has been divide, where T is the total number of time steps;
>
> point of interest $(x_i, y_i)$ in the set $\{(x_i, y_i)\}_{i=1, 2, \ldots, P}$ of lateral positions in the geographical region of interest, where P is the total number of points of interest, wherein the set $\{(x_i, y_i)\}_{i=1, 2, \ldots, P}$ may include every discrete lateral position in geographical region of interest or a subset thereof; and
>
> satellite $S_l$ in the subset $\{S_l\}_{l=1, \ldots, N}$ of satellites in the GNSS with elevation angles greater than the mask angle at time step $t_j$, where N is the total number of such satellites, the minimum height required for line-of-sight an "observer" (e.g., an aircraft) and the satellite $S_l$ may be computed.

For a given time step $t_j$, point of interest $(x_i, y_i)$, and satellite $S_l$, method 500 may comprise initializing the global minimum height required for line-of-sight to the satellite at the point of interest $(h_{vis}[x_i][y_i][S_l])$ as the altitude of the terrain at the point of interest $(h[x_i][y_i])$ (step 502), i.e., $$h_{vis}[x_i][y_i][S_l] = h[x_i][y_i] \tag{1}$$

The maximum distance along the azimuthal direction for which satellite visibility should be checked may then be determined (step 504). In some embodiments, the maximum azimuthal distance ($d_{max}$) depends on the mask angle ($\theta_{mask}$), the highest altitude in the geographical region of interest ($h_{max}$), and the altitude of the point of interest. For example, $$d_{max} = \frac{h_{max} - h[x_i][y_i]}{\tan \theta_{mask}} \tag{2}$$

After the maximum azimuthal distance is determined, algorithm 500 may iterate along the azimuthal vector from the point of interest to the satellite. Each iteration point along the azimuthal vector may be a lateral location $(x_k, y_k)$ that is a distance $d_k$ along the azimuthal vector. The first (k=1) iteration point may be initiated as follows:

$$x_{k=1} = x_i + \Delta_x \tag{3}$$

$$y_{k=1} = y_i + \Delta_y$$

In Equation (3), $\Delta_x$ represents a horizontal step size (e.g., a step size in the lateral x direction) and $\Delta_y$ represents a vertical step size (e.g., a step size in the lateral y direction). In some embodiments, $$\Delta_x = \cos(\gamma_{S_l})\delta_{step} \tag{4}$$

$$\Delta_y = \sin(\gamma_{S_l})\delta_{step}$$

Here, $\gamma_{S_l}$ is the azimuthal angle of the satellite and $\delta_{step}$ is a value provided by the mission planner. Adjacent iteration points along the azimuthal vector may be separated by a distance $\delta_{step}$. Accordingly, the distance $d_{k=1}$ along the azimuthal vector of the first iteration point may be $$d_{k=1} = \delta_{step} \tag{5}$$

At each iteration point along the azimuthal vector, the minimum altitude required for line-of-sight to the satellite from the lateral point of interest without obstruction by obstacles (e.g., buildings, trees, etc.) at the iteration point may be determined (step 508). This value, represented as $h_{vis,k}$ at an iteration point located a distance $d_k < d_{max}$ along the azimuthal vector, may be computed as follows:

$$h_{vis,k} = h[x_k][y_k] - d_k \tan \theta_{S_l} \tag{6}$$

In Equation (6), $\theta_{S_l}$ represents the elevation angle of the satellite and $h[x_k][y_k]$ represents the altitude of the terrain at the $k^{th}$ iteration point. The global minimum altitude required for line-of-sight to the satellite from the point of interest $(h_{vis}[x_i][y_i][S_l])$ may then be updated (step 510). In some embodiments, the updated value is given by Equation 7:

$$h_{vis}[x_i][y_i][S_l] = \max(h_{vis}[x_i][y_i][S_l], h_{vis,k}) \tag{7}$$

That is, the value of the global minimum altitude required for line-of-sight to the satellite from the point of interest may be updated to the minimum altitude required for line-of-sight to the satellite from the point of interest without obstruction by obstacles (e.g., buildings, trees, etc.) at the current iteration point if the minimum altitude required line-of-sight to the satellite from the point of interest without obstruction by obstacles (e.g., buildings, trees, etc.) at the current iteration point is greater than the current value of the global minimum altitude required for line-of-sight to the satellite from the point of interest.

Steps 508-510 may be repeated for each iteration point located a distance $d_k < d_{max}$ along the azimuthal vector. That is, after the execution of step 510 for a given iteration point $(x_k, y_k)$, $$k = k + 1 \qquad (8)$$

$$x_{k+1} = x_k + \Delta_x$$

$$y_{k+1} = y_k + \Delta_y$$

$$d_{k+1} = d_k + \delta_{step}$$

The final value of the global minimum altitude required for line-of-sight to the satellite from the point of interest after steps 508-510 have been executed for every iteration point located a distance less than the maximum azimuthal distance along the azimuthal vector may be the actual minimum altitude required for line-of-sight from the point of interest to the satellite.

A visualization of algorithm 500 is provided in FIG. 5B. As shown, a point of interest (POI) may be a lateral location (i.e., a location in the x-y plane) in the gridded map of the geographical region. The terrain (e.g., the obstacles) at the POI may have a height $h[x_i][y_i]$. For a satellite $S_l$ with an azimuthal angle $\gamma_{S_l}$ and an elevation angle $\theta_{S_l}$, algorithm 500 may determine the global minimum altitude required for line-of-sight to the satellite from the POI by computing, at each of a plurality of iteration points (IPs) along the azimuthal vector between the POI and the satellite, the minimum altitude required for line-of-sight to the satellite from the POI without obstruction from the terrain at the IP.

The value of the maximum azimuthal distance may impact the overall run time of algorithm 500. Algorithm 500 can be optimized by updating the value of the maximum azimuthal distance whenever the value of the global minimum altitude required for line-of-sight to the satellite from the point of interest is updated. That is, for each updated value of $h_{vis}[x_i][y_i][S_l]$, the value of $d_{max}$ may be updated as follows:

$$d_{max} = \frac{h_{max} - h_{vis}[x_i][y_i][S_l]}{\tan \theta_{mask}} \qquad (9)$$

The second example algorithm 600 (FIG. 6A) may determine, for each satellite in the GNSS, at each time step, for a given lateral (i.e., (x, y)) position in the geographical region, the minimum heights at which the satellite is not blocked by terrain (e.g., obstacles such as buildings, trees, etc.) at said lateral position. Specifically, for each satellite in the GNSS, at each time step, for a given lateral (i.e., (x, y)) position in the geographical region, method 600 may iterate along a vector representing the "shadow" that would be cast by terrain at said lateral position if the satellite was a shining a light on the lateral position (e.g., if the satellite was a sun).

For each time step in the time period, method 600 may be performed for every satellite with an elevation angle that exceeds the mask angle and for every lateral point of interest (POI) defined in the geographical region. That is, method 600 may be performed for each:

time step $t_j$ in the set $\{t_j\}_{j=1, 2, \ldots, T}$ of time steps into which the time period of interest has been divide, where T is the total number of time steps;

point of interest $(x_i, y_i)$ in the set $\{(x_i, y_i)\}_{i=1, 2, \ldots, P}$ of lateral positions in the geographical region of interest, where P is the total number of points of interest, wherein the set $\{(x_i, y_i)\}_{i=1, 2, \ldots, P}$ may include every discrete lateral position in geographical region of interest or a subset thereof; and satellite $S_l$ in the subset $\{S_l\}_{l=1, \ldots, N}$ of satellites in the GNSS with elevation angles greater than the mask angle at time step $t_j$, where N is the total number of such satellites.

For a given time step $t_j$, point of interest $(x_i, y_i)$, and satellite $S_l$, method 600 may comprise initializing the minimum height required the satellite to be visible from the point of interest ($h_{vis}[x_i][y_i][S_l]$) as the altitude of the terrain at the point of interest ($h[x_i][y_i]$) (step 602), i.e., $$h_{vis}[x_i][y_i][S_l] = h[x_i][y_i] \qquad (10)$$

Algorithm 600 may iterate along a "shadow" line between the point of interest height and the ground that is directed away from the satellite (i.e., in the direction opposite to the azimuthal vector between the point of interest and the satellite) (step 604). This line may represent a shadow that would be cast by the terrain at the point of interest as a result of light from a light source (e.g., a sun) positioned at the location of the satellite. The first (k=1) iteration point along the shadow line may be:

$$x_{k=1} = x_i + \Delta_x \qquad (11)$$

$$y_{k=1} = y_i + \Delta_y$$

$$h_k = h[x_i][y_i] - \Delta_h$$

In Equation (11), $\Delta_x$ represents a horizontal step size (e.g., a step size in the lateral x direction) and $\Delta_y$ represents a vertical step size (e.g., a step size in the lateral y direction), and $\Delta_h$ represents an altitude step size (e.g., a step size in the z direction). In some embodiments, $$\Delta_x = \cos(\gamma_{S_l} + \pi)\delta_{step} \qquad (12)$$

$$\Delta_y = \sin(\gamma_{S_l} + \pi)\delta_{step}$$

$$\Delta_y = \tan(\theta_{S_l})\delta_{step}$$

Here, $\gamma_{S_l}$ is the azimuthal angle of the satellite, $\theta_{S_l}$ is the elevation angle of the satellite, and $\delta_{step}$ is a value provided by the mission planner. Shifting the azimuthal angle $\gamma_{S_l}$ by $\pi$ may in the arguments of the trigonometric functions used to compute $\Delta_x$ and $\Delta_y$ may ensure that the iteration points move in the opposite direction of the azimuthal vector between the point of interest and the satellite. Similarly, the height $h_k$ of the shadow line at the first iteration point is decreased from the terrain height at the point of interest by $\Delta_h$, ensuring that the first iteration point along the shadow line moves away from the satellite (e.g., toward the ground).

At each iteration point along the shadow line, the minimum height required for the satellite to be visible from the lateral position corresponding to the iteration point ($h_{vis}[x_k][y_k][S_l]$) may be initialized to the height of the terrain at the lateral position $(x_k, y_k)$ corresponding to the iteration point ($h[x_k][y_k]$):

$$h_{vis}[x_k][y_k][S_l] = h[x_k][y_k] \qquad (13)$$

The height of the terrain at the lateral position corresponding to the iteration point may be compared to the height of the shadow at the iteration point ($h_k$) to determine whether the height of the terrain at the lateral position corresponding to the iteration point is below the height of the shadow at the iteration point (step 606). The minimum height required for the satellite to be visible from the lateral position corresponding to the iteration point may be updated (step 608). In some embodiments, the updated value is given by Equation 14:

$$h_{vis}[x_k][y_k][S_l] = \max(h_{vis}[x_k][y_k][S_l], h_k) \qquad (14)$$

That is, the value of the minimum height required for the satellite to be visible from the lateral position corresponding to the iteration point may be updated to the height of the shadow at the iteration point if the height of the shadow line at the iteration point exceeds the height of the terrain at the lateral position corresponding to the iteration point.

Steps 606-608 may be repeated for each iteration point located along the shadow line. That is, after the execution of step 608 for a given iteration point ($x_k$, $y_k$), $$k = k + 1 \qquad (15)$$

$$x_{k+1} = x_k + \Delta_x$$

$$y_{k+1} = y_k + \Delta_y$$

$$h_{k+1} = h_k - \Delta_h$$

A visualization of algorithm 600 is provided in FIG. 6B. As shown, a point of interest (POI) may be a lateral location (i.e., a location in the x-y plane) in the gridded map of the geographical region. The terrain (e.g., the obstacles) at the POI may have a height $h[x_i][y_i]$. The satellite $S_l$ in the GNSS may have an azimuthal angle $\gamma_{S_l}$ and an elevation angle $\theta_{S_l}$ at a given time point. Algorithm 600 may iterate along a plurality of iteration points (IPs) along the shadow line between point ($x_i$, $y_i$, $h[x_i][y_i]$) and the ground. At each IP, the minimum height required for the satellite to be visible from the lateral position corresponding to the IP may be determined.

Method 600 may continue to iterate along a shadow line as long as the iteration points along the shadow line remain within the map dimensions and as long as the height of the shadow line is above the minimum altitude in the geographical region (e.g., the minimum mean sea level (MSL) altitude). Iteration along the shadow line can also stop if the height of the terrain at the lateral position corresponding to an iteration point along the shadow line exceeds the height of the shadow at the iteration point, i.e., $$\text{if } (h_k \leq h_{vis}[x_k][y_k][S_l] = h[x_k][y_k]) \qquad (16)$$

$$\text{exit}$$

These stopping conditions may accelerate the execution of method 600.

Both algorithm 500 and algorithm 600 may be parallelized. For example, if the computer system being used to model GNSS performance comprises a GPU, then the calculations for each point of interest and each satellite can be performed simultaneously on separate GPU threads. This may significantly accelerate the satellite visibility calculation stage of the GNSS performance modeling method (method 300).

Output Stage

Following the satellite visibility calculation stage 304, method 300 may move to the output stage 306. In the output stage 306, the results of the satellite visibility calculations performed in stage 304 may be organized and processed so that GNSS performance information may be provided to the mission planner. As shown in FIG. 3, the first step 306(i) in the output stage 306 may involve analyzing the combinations of satellites in the GNSS that are visible at each point in the four-dimensional map of the geographical region of interest.

Figure 7:
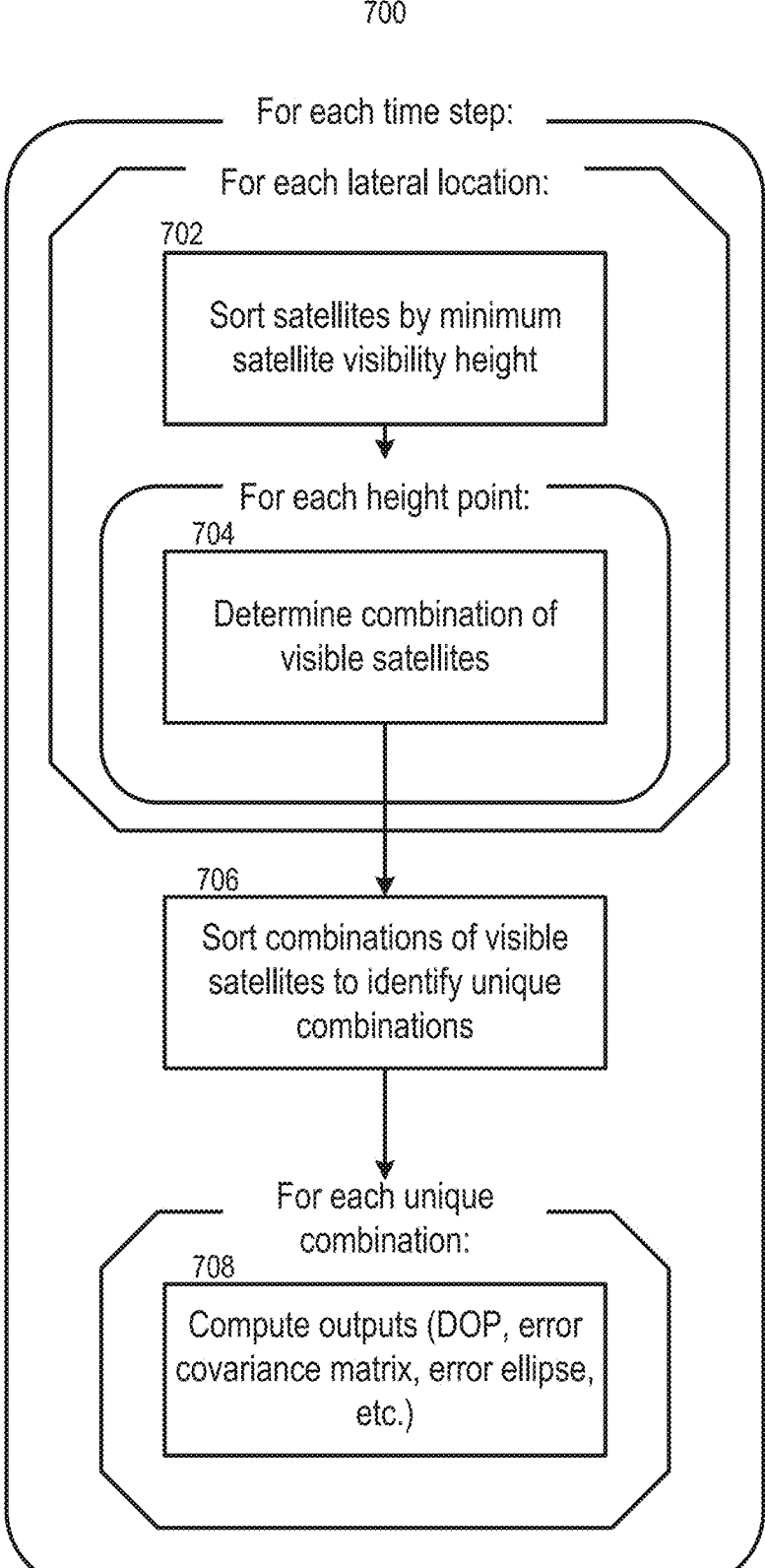
FIG. 7 shows a method for analyzing visible satellite combinations, according to some embodiments.

An exemplary method 700 for analyzing visible satellite combinations is provided in FIG. 7. Method 700 may be executed during step 306(i) of the output stage 306 of method 300. Method 700 may begin with the sorting, for each time point and for each lateral position in the four-dimensional map of the geographical region, the satellites in the GNSS according to the minimum height at which each satellite is visible from the lateral position at the time point (calculated during the satellite visibility calculation stage 304 of method 300) (step 702). That is, for each point (x, y, *, t) in the four-dimensional map of the geographical region, the satellites in the GNSS may be sorted according to the minimum height at which each satellite is visible from the (x, y) location at time t.

After the satellites are sorted according to their minimum visibility heights for a given lateral position and a given time, the combinations of satellites that are visible at each height point with the given lateral position at the given time may be determined (step 704). In other words, once the satellites have been sorted for a given point (x, y, *, t) in the four-dimensional map of the geographical region, the combinations of satellites that are visible, at time t, at each height point z with a lateral position (x, y) may be identified.

Once the combinations of visible satellites at each height point at a given lateral position and a given time have been identified, the satellite combinations across all height points at the lateral position at said time may be sorted so that all unique combinations of visible satellites across all height points can be identified (step 706). For example, if, during step 704, it is determined that:

the satellite combination {$S_1$, $S_4$, $S_9$} is visible at point (x, y, $z_1$, t), the satellite combination {$S_5$, $S_{12}$, $S_{17}$, $S_{31}$} is visible at point (x, y, $z_2$, t), and the satellite combination {$S_1$, $S_4$, $S_9$} is visible at point (x, y, $z_3$, t), then, during step 706, at least two unique satellite combinations visible at point (x, y, *, t) across all height points will be identified: combination {$S_1$, $S_4$, $S_9$} and combination {$S_5$, $S_{12}$, $S_{17}$, $S_{31}$}.

The visibility of a given satellite $S_k$ can be indicated using a binary integer. The number of bits in the binary integer may correspond to the maximum number of satellites that can be visible above the mask angle at any given time. If satellite $S_k$ is visible at point (x, y, z, t), the value of the $k^{th}$ bit in the binary integer may be set to 1. Visible satellite combinations at a given point (x, y, z, t) may be represented by taking the sum of the binary integers corresponding to each satellite that is visible at (x, y, z, t). For instance, the visibility of satellites $S_0$, $S_2$, and $S_3$ at point (x, y, z, t) may be indicated by binary integers 0001, 0100, and 1000, respectively. The visible combination $\{S_0, S_2, S_3\}$ may be computed by taking the following sum:

$$0001 + 0100 + 1000 = 1101 \qquad 5$$

That is, the binary integer 1101 may represent the combination of satellites visible at (x, y, z, t). The binary integers representing visible satellite combinations at (x, y, *, t) across all height points may be sorted and all unique integers, as well as the frequency at which each unique integer appears, may be determined, for example using a reduce-by-key operation.

One or more of the aforementioned steps of method 700 may be parallelized. For example, if the computer system executing method 700 (e.g., computer system 202 shown in FIG. 2) includes a GPU, then the computations for each point of interest and each satellite (e.g., the computations performed in step 702 and step 706) can be performed simultaneously on separate GPU threads. This may significantly accelerate the satellite visibility calculation stage of the GNSS performance modeling method (stage 304 of method 300 shown in FIG. 3).

Various output values may be computed for each unique visible satellite combination identified in step 706 (step 708). These output values may indicate the GNSS performance quality provided by each unique combination at each (x, y, *, t) in the four-dimensional map of the geographical region.

In some embodiments, the output values computed for a satellite combination include dilution of precision (DOP) values that quantify the contribution of the relative geometry of a satellite combination to errors in position measurements provided by the satellite combination. The geometry of a satellite combination may be represented by an observation matrix H:

$$H = \begin{bmatrix} a_{x1} & a_{y1} & a_{z1} & 1 \\ a_{x2} & a_{y2} & a_{z2} & 1 \\ \vdots & \vdots & \vdots & \vdots \\ a_{xn} & a_{yn} & a_{zn} & 1 \end{bmatrix} \qquad (17)$$

Each vector $(a_{xi}, a_{yi}, a_{zi})$ in H may denote the unit vector from a linearization point to the $i^{th}$ satellite in the satellite combination. The dilution of precision may be given by the DOP matrix $(H^T H)^{-1}$:

$$\left(H^T H\right)^{-1} = \begin{bmatrix} D_{11} & D_{12} & D_{13} & D_{14} \\ D_{21} & D_{22} & D_{23} & D_{24} \\ D_{31} & D_{32} & D_{33} & D_{34} \\ D_{41} & D_{42} & D_{43} & D_{44} \end{bmatrix} \qquad (18)$$

Various DOP metrics may be obtained from the DOP matrix. These metrics include:

the geometric dilution of precision (GDOP), which represents the ratio of position error to range error along all dimensions and may be given by the square root of the sum of the diagonal entries in the DOP matrix (GDOP= $\sqrt{D_{11}+D_{22}+D_{33}+D_{44}}$);

the positional dilution of precision (PDOP), which represents the positional elements in the DOP matrix and may be given by the square root of the sum of the first three diagonal entries in the DOP matrix (PDOP= $\sqrt{D_{11}+D_{22}+D_{33}}$);

the horizontal dilution of precision (HDOP), which represents the lateral positional elements in the DOP matrix and may be given by the square root of the sum of the first two diagonal entries in the DOP matrix (HDOP= $\sqrt{D_{11}+D_{22}}$); and the vertical dilution of precision (VDOP), which represents the vertical positional element in the DOP matrix and may be given by the square root of the third diagonal entry in the DOP matrix (VDOP= $\sqrt{D_{33}}$)

The observation matrix may be related to a state vector Lx that represents a position of an observer (e.g., an aircraft with a GPS receiver) provided by the satellite combination:

$$\Delta x = \begin{bmatrix} x_o \\ y_o \\ z_o \\ c\delta t_o \end{bmatrix} \qquad (19)$$

In the state vector, $x_o$, $y_o$, and $z_o$ may represent the three-dimensional user position and $c\delta t_o$ may represent the receiver clock bias. The observation matrix and the state vector may be related by the following equation:

$$H\Delta x = \Delta \rho \qquad (20)$$

where $\Delta \rho$ indicates pseudorange measurements from the n satellites in the satellite combination. If a constant user ranging error (URE) is assumed for all satellites in the combination, then a position error covariance matrix cov (dx) may be computed for the satellite combination, e.g., using the following equation:

$$\text{cov}(dx) = \left(H^T H\right)^{-1} \text{cov}(D\rho) = \left(H^T H\right)^{-1}\left(I\sigma_{URE}^2\right) \qquad (21)$$

Here, cov(Dρ) may be a diagonal matrix containing the constant URE value, I may be the identity matrix, and $$\sigma_{URE}^2$$

may be the constant user ranging error. If, on the other hand, each satellite in the satellite combination has a different pseudorange error covariance, then the covariance matrix may be computed as follows:

$$\text{cov}(dx) = \left(H^T H\right)^{-1} H^T \text{cov}(D\rho) H \left(H^T H\right)^{-1} \qquad (22)$$

where cov(Dρ) is a diagonal matrix of URE values corresponding to the satellites represented in the observation matrix. In some embodiments, the output values that are computed for a satellite combination comprise the covariance matrix.

Additional outputs for a satellite combination may be derived from the covariance matrix. The diagonal elements of the covariance matrix may represent variances along the directions of the axes in the observer's local coordinate system. The principal components of the principal error distribution may not be aligned with this local frame; rather, the principal components may form their own coordinate system defined by the eigenvectors of the covariance matrix. To capture the variances of the position error distribution in the local frame, the upper-left 2×2 sub-matrix of the covariance matrix may be considered. The eigenvectors of this 2×2 submatrix may together define the semi-major and semi-minor axes of an ellipse. This ellipse can be used to determine the probability that an aircraft's navigation system causes a collision and thus may be provided as an output for each satellite combination.

Like the preceding steps of method 700, step 708 may be parallelized. For example, if the computer system executing method 700 (e.g., computer system 202 shown in FIG. 2) includes a GPU, then the computations for unique combination of visible satellites can be performed simultaneously on separate GPU threads. This may significantly accelerate the satellite visibility calculation stage of the GNSS performance modeling method (stage 304 of method 300 shown in FIG. 3).

Once the visible satellite combinations have been analyzed (step 306($i$) in the output stage 306 of method 300) and the output data has been computed (step 306(4)) for each point in the four-dimensional map of the geographical region, the output data may be returned to the mission planner (step 306($iii$)). The output data may be returned to the mission planner as an array of values comprising, e.g., values representing the visible satellite combinations at each point in the geographical region as well as the corresponding output values. Additionally or alternatively, the computer system may generate one or more graphical representations of the GNSS performance information. For example, the computer system may generate, for each time step, a graphical representation of the geographical region that includes indications of locations in the region at the time step where GNSS performance is predicted to be of high quality (e.g., locations where at least a threshold number of satellites are predicted to be visible).

The GNSS performance information may be used to generate a flight plan for an aircraft. The flight plan can be produced by the mission planner, by the computer system, or by a combination thereof. Generating a flight plan may comprise identifying a flight path between two or more locations (a departure location and one or more destination locations) that restricts the aircraft to regions of high-quality GNSS performance. The flight plan may be provided to a pilot of the aircraft (e.g., a remote pilot of an unmanned aircraft) or directly to the aircraft itself (e.g., if the aircraft is primarily autonomous).

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

As used herein, the singular forms "a", "an", and "the" include the plural reference unless the context clearly dictates otherwise. Reference to "about" a value or parameter or "approximately" a value or parameter herein includes (and describes) variations that are directed to that value or parameter per se. For example, description referring to "about X" includes description of "X". It is understood that aspects and variations of the invention described herein include "consisting of" and/or "consisting essentially of" aspects and variations.

When a range of values or values is provided, it is to be understood that each intervening value between the upper and lower limit of that range, and any other stated or intervening value in that stated range, is encompassed within the scope of the present disclosure. Where the stated range includes upper or lower limits, ranges excluding either of those included limits are also included in the present disclosure.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A method for global navigation satellite system (GNSS)-based navigation, the method comprising:
    retrieving, from one or more databases:
        terrain data for a geographical region comprising, for each of a plurality of lateral positions in the geographic region, elevation values associated with a height of the terrain at the lateral position, and
        satellite orbit data for a GNSS comprising a plurality of satellites,
    for each time step of a plurality of time steps in a time period and for each lateral position of the plurality of lateral positions in the geographic region:
        determining, for each satellite of the plurality of satellites in the GNSS, a minimum height at which the satellite is visible from the lateral position at the time step,
        determining one or more unique combinations of satellites visible from the lateral position at the time step based on the minimum heights at which each satellite is visible from the lateral position, and
        generating, for each of the one or more unique combinations of satellites, one or more error objects indicating GNSS performance quality corresponding to the unique combination of satellites;
    determining GNSS performance quality information based on the one or more unique combinations of satellites and the respective one or more error objects; and
    operating at least one aircraft based on the GNSS performance quality information.

2. The method of claim 1, comprising receiving information indicating the geographical region and the time period.

3. The method of claim 1, wherein the geographical region corresponds to a region in which the at least one aircraft will be operating and wherein the time period corresponds to a time frame in which the at least one aircraft will be operating.

4. The method of claim 1, comprising, for each satellite of the plurality of satellites, propagating a trajectory of the satellite during the time period.

5. The method of claim 1, wherein determining, for a satellite of the plurality of satellites in the GNSS, the minimum height at which the satellite is visible from a lateral position of the plurality of lateral positions at a time step of the plurality of time steps comprises:

determining, at one or more locations along an azimuthal vector between the lateral position and the satellite, a minimum altitude required for line-of-sight to the satellite from the lateral position without obstruction by terrain at each azimuthal vector location.

6. The method of claim 1, wherein determining, for a satellite of the plurality of satellites in the GNSS, the minimum height at which the satellite is visible from a lateral position of the plurality of lateral positions at a time step of the plurality of time steps comprises:

iterating along a shadow line that starts at a height point corresponding to the lateral position and is directed away from the satellite; and at one or more lateral locations corresponding to one or more points along the shadow line, determining a minimum altitude required for the satellite to be visible based on a height of the shadow line at said point.

7. The method of claim 1, wherein determining the one or more unique combinations of visible satellites at a time step of the plurality of time steps at a lateral position of the plurality of lateral locations comprises determining, based on the minimum heights at which each satellite is visible from the lateral position at the time step, for each of a plurality of height points located at the lateral position, a combination of satellites of the plurality of satellites that are visible at the height point.

8. The method of claim 1, wherein the one or more error objects comprises a dilution of precision value.

9. The method of claim 1, wherein the one or more error values comprises a covariance matrix.

10. The method of claim 1, wherein the minimum heights at which each satellite is visible at each lateral position are determined simultaneously for each time step using a GPU.

11. The method of claim 1, wherein the one or more unique combinations of visible satellites at each lateral position are determined simultaneously for each time step using a GPU.

12. The method of claim 1, wherein outputting GNSS performance quality information comprises generating and displaying a graphical representation of GNSS performance quality in the geographical region at each time step.

13. The method of claim 1, wherein operating the at least one aircraft comprises generating a flight plan for the one or more aircraft based on the GNSS performance quality information.

14. The method of claim 13, comprising controlling the at least one aircraft based on the flight plan.

15. The method of claim 1, wherein an aircraft of the at least one aircraft is an unmanned aerial vehicle (UAV).

16. The method of claim 1, wherein the terrain data comprises one or more digital surface maps.

17. The method of claim 1, wherein the orbit data comprises GNSS almanac data.

18. The method of claim 1, wherein the geographical region comprises an urban environment.

19. The method of claim 1, wherein the GNSS is the Global Positioning System (GPS).

20. A system for global navigation satellite system (GNSS)-based navigation, the system comprising:

at least one aircraft; and a computer system comprising one or more processors, wherein the one or processors are configured to:

retrieve, from one or more databases:

terrain data for a geographical region comprising, for each of a plurality of lateral positions in the geographic region, elevation values associated with a height of the terrain at the lateral position, and satellite orbit data for a GNSS comprising a plurality of satellites, for each time step of a plurality of time steps in a time period and for each lateral position of the plurality of lateral positions in the geographic region:

determine, for each satellite of the plurality of satellites in the GNSS, a minimum height at which the satellite is visible from the lateral position at the time step, determine one or more unique combinations of satellites visible from the lateral position at the time step based on the minimum heights at which each satellite is visible from the lateral position, and generate, for each of the one or more unique combinations of satellites, one or more error objects indicating GNSS performance quality corresponding to the unique combination of satellites;

determine GNSS performance quality information based on the one or more unique combinations of satellites and the respective one or more error objects; and operate the at least one aircraft based on the GNSS performance quality information.

21. The system of claim 20, wherein the one or more processors of the computer system are configured to receive information indicating the geographical region and the time period.

22. The system of claim 20, wherein the geographical region corresponds to a region in which the at least one aircraft will be operating and wherein the time period corresponds to a time frame in which the at least one aircraft will be operating.

23. The system of claim 20, wherein, for each satellite of the plurality of satellites, the one or more processors of the computer system are configured to propagate a trajectory of the satellite during the time period.

24. The system of claim 20, wherein determining, for a satellite of the plurality of satellites in the GNSS, the minimum height at which the satellite is visible from a lateral position of the plurality of lateral positions at a time step of the plurality of time steps comprises:

determining, at one or more locations along an azimuthal vector between the lateral position and the satellite, a minimum altitude required for line-of-sight to the satellite from the lateral position without obstruction by terrain at each azimuthal vector location.

25. The system of claim 20, wherein determining, for a satellite of the plurality of satellites in the GNSS, the minimum height at which the satellite is visible from a lateral position of the plurality of lateral positions at a time step of the plurality of time steps comprises:

iterating along a shadow line that starts at a height point corresponding to the lateral position and is directed away from the satellite; and at one or more lateral locations corresponding to one or more points along the shadow line, determining a minimum altitude required for the satellite to be visible based on a height of the shadow line at said point.

26. The system of claim 20, wherein determining the one or more unique combinations of visible satellites at a time step of the plurality of time steps at a lateral position of the plurality of lateral locations comprises determining, based on the minimum heights at which each satellite is visible from the lateral position at the time step, for each of a plurality of height points located at the lateral position, a combination of satellites of the plurality of satellites that are visible at the height point.

27. The system of claim 20, wherein the one or more error objects comprises a dilution of precision value.

28. The system of claim 20, wherein the one or more error values comprises a covariance matrix.

29. The system of claim 20, wherein the one or more processors of the computer system comprise a GPU.

30. The system of claim 29, wherein the minimum heights at which each satellite is visible at each lateral position are determined simultaneously for each time step using the GPU.

31. The system of claim 29, wherein the one or more unique combinations of visible satellites at each lateral position are determined simultaneously for each time step using the GPU.

32. The system of claim 20, wherein outputting GNSS performance quality information comprises generating and displaying a graphical representation of GNSS performance quality in the geographical region at each time step.

33. The system of claim 20, wherein operating the at least one aircraft comprises generating a flight plan for the one or more aircraft based on the GNSS performance quality information.

34. The method of claim 33, wherein the one or more processors of the computer system are configured to control the at least one aircraft based on the flight plan.

35. The system of claim 20, wherein an aircraft of the at least one aircraft is an unmanned aerial vehicle (UAV).

36. The system of claim 20, wherein the terrain data comprises one or more digital surface maps.

37. The system of claim 20, wherein the orbit data comprises GNSS almanac data.

38. The system of claim 20, wherein the geographical region comprises an urban environment.

39. The system of claim 20, wherein the GNSS is the Global Positioning System (GPS).

* * * * *